US009751391B2

(12) United States Patent
Lebeau et al.

(10) Patent No.: US 9,751,391 B2
(45) Date of Patent: Sep. 5, 2017

(54) TRANSMISSION ASSEMBLY FOR A MOTOR VEHICLE

(71) Applicant: VALEO EQUIPEMENTS ELECTRIQUES MOTEUR, Creteil (FR)

(72) Inventors: Fabien Lebeau, Harly (FR); Khadija El Baraka, Serris (FR); Svetislav Jugovic, Athis-Mons (FR); Vicent Cornet, Amiens (FR); Gilles Lebas, Villiers Bretonneux (FR)

(73) Assignee: Valeo Equipements Electriques Moteur (FR)

( * ) Notice: Subject to any disclaimer, the term of this patent is extended or adjusted under 35 U.S.C. 154(b) by 317 days.

(21) Appl. No.: 14/427,341

(22) PCT Filed: Sep. 20, 2013

(86) PCT No.: PCT/FR2013/052180
§ 371 (c)(1),
(2) Date: Mar. 11, 2015

(87) PCT Pub. No.: WO2014/049243
PCT Pub. Date: Apr. 3, 2014

(65) Prior Publication Data
US 2015/0231957 A1    Aug. 20, 2015

(30) Foreign Application Priority Data

Sep. 25, 2012  (FR) ...................................... 12 58978

(51) Int. Cl.
*B60K 6/40*      (2007.10)
*F16D 13/38*     (2006.01)
(Continued)

(52) U.S. Cl.
CPC .................. *B60K 6/40* (2013.01); *B60K 6/26* (2013.01); *B60K 6/387* (2013.01); *B60K 6/48* (2013.01);
(Continued)

(58) Field of Classification Search
None
See application file for complete search history.

(56) References Cited

U.S. PATENT DOCUMENTS 4,671,125 A    6/1987  Yabunaka
4,936,428 A    6/1990  Leigh-Monstevens et al.
(Continued)

FOREIGN PATENT DOCUMENTS

DE    19934936    2/2000
DE    10103795    8/2001
(Continued)

*Primary Examiner* — Colby M Hansen
(74) *Attorney, Agent, or Firm* — Berenato & White, LLC

(57) ABSTRACT

A transmission assembly for a motor vehicle having a gearbox including a clutch, a clutch-release device, a reversible rotary electric machine provided with a rotor provided with a central opening, and an intermediate shaft between the clutch and the rotor of the electric machine, the shaft supporting the clutch-release device at the front and being inserted in the central opening of the rotor. The transmission assembly includes a dry friction clutch provided with a reaction plate, and comprises, at the front, a damping double flywheel configured such as to be attached to the crankshaft of the heat engine of the vehicle and to form the reaction plate of the dry friction clutch and, at the rear, a torsion damper configured such as to be rotatably connected to the input shaft of the gearbox, the rotor of the electric machine being attached to the torsion damper.

20 Claims, 10 Drawing Sheets

(51) Int. Cl.
  *H02K 7/00* (2006.01)
  *H02K 7/108* (2006.01)
  *B60K 6/26* (2007.10)
  *F16F 15/131* (2006.01)
  *B60K 6/387* (2007.10)
  *B60K 6/48* (2007.10)

(52) U.S. Cl.
  CPC ........ *F16D 13/38* (2013.01); *F16F 15/13121* (2013.01); *H02K 7/006* (2013.01); *H02K 7/108* (2013.01); *Y10S 903/951* (2013.01)

(56) References Cited

U.S. PATENT DOCUMENTS

| | | |
|---|---|---|
| 5,141,091 A | 8/1992 | Perez et al. |
| 6,116,364 A | 9/2000 | Taguchi et al. |
| 6,373,155 B1 | 4/2002 | Shimizu et al. |
| 6,455,968 B2 | 9/2002 | Honorio et al. |
| 6,561,336 B1 | 5/2003 | Huart et al. |
| 6,628,021 B2 | 9/2003 | Shinohara et al. |
| 8,459,425 B2 | 6/2013 | Ruder et al. |
| 2010/0237726 A1 | 9/2010 | Hayakawa et al. |
| 2011/0031838 A1 | 2/2011 | Serra et al. |
| 2011/0162480 A1 | 7/2011 | Ruder et al. |
| 2011/0224043 A1 | 9/2011 | Bachmann et al. |
| 2011/0259698 A1 | 10/2011 | Arnold et al. |
| 2015/0211583 A1* | 7/2015 | Jugovic .................. B60K 6/26 192/48.1 |
| 2015/0217632 A1* | 8/2015 | Lebeau .................. B60K 6/26 192/110 B |

FOREIGN PATENT DOCUMENTS

| | | |
|---|---|---|
| DE | 102010054545 | 8/2011 |
| DE | 102011107144 | 2/2012 |
| DE | 102010050685 | 5/2012 |
| EP | 0831580 | 3/1998 |
| EP | 1107433 | 6/2001 |
| EP | 1279828 | 1/2003 |
| EP | 2311680 | 4/2011 |
| FR | 2473140 | 7/1981 |
| FR | 2619880 | 3/1989 |
| FR | 2745444 | 8/1997 |
| FR | 2751275 | 1/1998 |
| FR | 2797472 | 2/2001 |
| FR | 2830589 | 4/2003 |
| FR | 2881382 | 8/2006 |
| FR | 2881494 | 8/2006 |
| WO | WO2006061349 | 6/2006 |
| WO | WO2010079273 | 7/2010 |

* cited by examiner

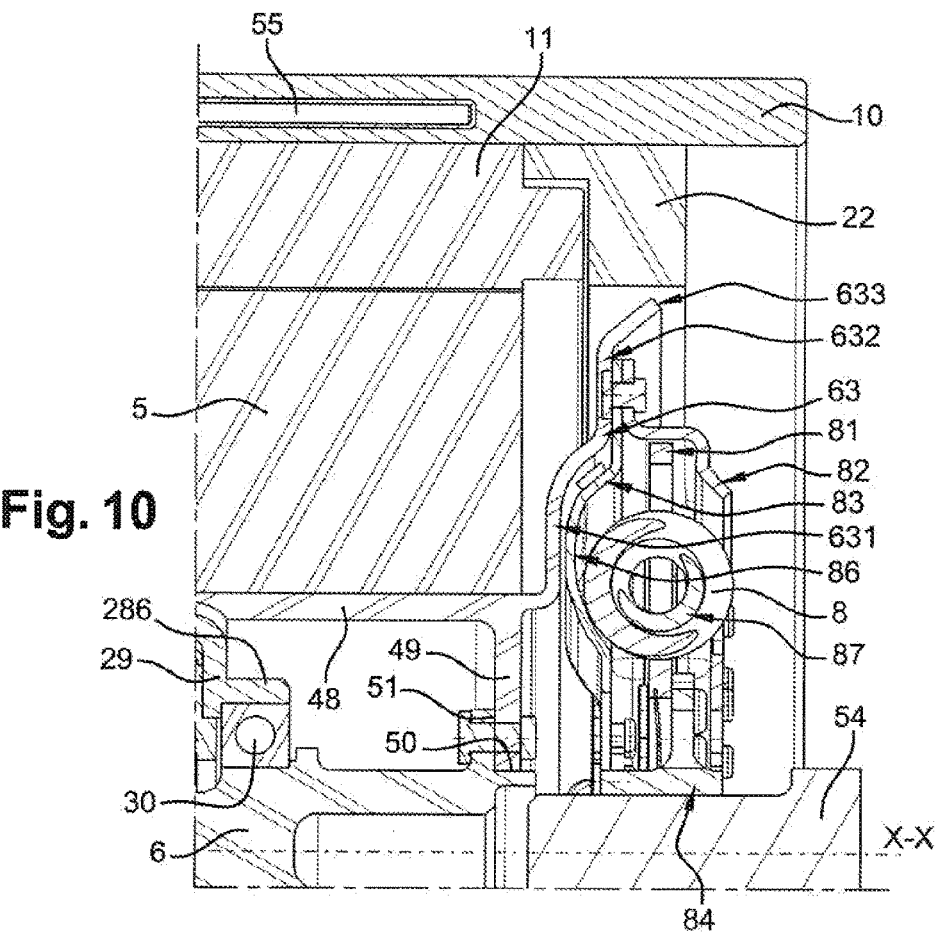
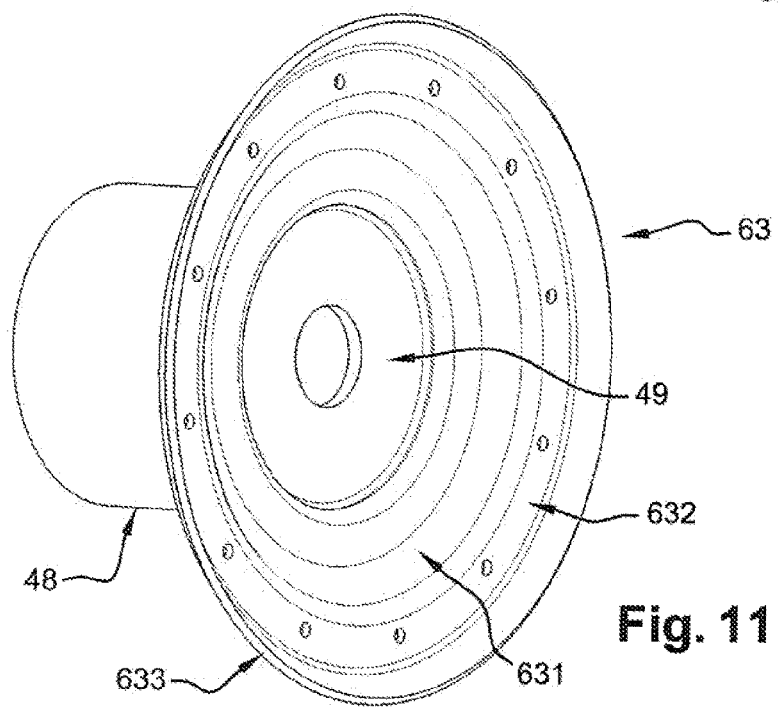
Fig. 10
Fig. 11

TRANSMISSION ASSEMBLY FOR A MOTOR VEHICLE

CROSS-REFERENCE TO RELATED APPLICATIONS AND CLAIM TO PRIORITY

This application is a national stage application of International Application No. PCT/FR2013/052180 filed Sep. 20, 2013, which claims priority to French Patent Application No. 1258978 filed Sep. 25, 2012, of which the disclosures are incorporated herein by reference and to which priority is claimed.

FIELD OF THE INVENTION

The invention relates to a transmission assembly for a motor vehicle which is interposed between the thermal engine and the gearbox of the vehicle.

PRIOR ART

Movement transmission assemblies for motor vehicles are known with a gearbox comprising a clutch, a clutch release device, a reversible rotary electrical machine provided with a rotor with a central opening, an intermediate shaft between the clutch and the rotor of the electrical machine, the said shaft bearing the release device at the front, and penetrating in the central opening in the rotor.

According to one embodiment, the clutch is a wet clutch comprising a plurality of friction discs implanted in a chamber, in the interior of which a control fluid circulates. The clutch is implanted in the interior of the rotor.

A solution of this type is costly, and requires use of an electrical machine which is cumbersome radially.

OBJECTIVE OF THE INVENTION

The objective of the present invention is to reduce the cost of the assembly, whilst reducing the radial size of the electrical machine.

According to the invention, the transmission assembly for a motor vehicle with a gearbox comprising a clutch, a clutch release device, a reversible rotary electrical machine provided with a rotor with a central opening, an intermediate shaft between the clutch and the rotor of the electrical machine, the said shaft bearing the release device at the front, and penetrating in the central opening in the rotor, is characterised in that it comprises a dry friction clutch provided with a reaction plate. According to the invention, the transmission assembly comprises at the front a double damping flywheel which is configured to be secured on the crankshaft of the thermal engine of the vehicle, and to form the reaction plate of the dry friction clutch, and at the rear, it comprises a torsion damper which is configured to be connected in rotation to the input shaft of the gearbox, the rotor of the electrical machine being secured on the torsion damper.

According to one embodiment, a transmission assembly is provided which comprises a hybrid module comprising the release device, the electrical machine and the torsion damper.

According to one embodiment, the intermediate shaft extends overhanging at the front of the module.

According to one embodiment, the hybrid module comprises a support comprising first securing means to be secured on the housing of the gearbox, and second securing means to be secured on the housing of the thermal engine.

In addition, according to this embodiment, in its interior between the first and second securing means, the support bears the stator of the electrical machine.

According to one embodiment, the first and second securing means consist of projecting outer rims which are perforated for the passage of securing units.

According to one embodiment, the stator comprises an interconnector with connection terminals for interconnection with a power connector, the support comprising at the rear a passage for the connection terminals.

According to one embodiment, the support has a cooling circuit in order to cool the stator.

According to one embodiment, the support has an input orifice and an output orifice for the cooling circuit.

According to one embodiment, the support bears a cooling tube with an input and an output for a fluid for cooling of the stator.

According to one embodiment, the support comprises an inner separation flange between the electrical machine and the friction clutch. In addition, according to this embodiment, the flange has at its inner end an axial sleeve which penetrates in the interior of the rotor of the machine and through which the intermediate shaft passes.

According to one embodiment, the sleeve has a base which is perforated centrally for the passage of the shaft.

According to one embodiment, the sleeve has a first axial portion and a second axial portion with a diameter which is reduced relative to the first portion, for fitting of a bearing, such as a ball bearing, for rotation of the shaft.

According to one embodiment, the first portion and the second portion extend axially on both sides of the base.

According to one embodiment, the assembly comprises a release device for the friction clutch fitted partly in the interior of the first portion of the sleeve.

According to one embodiment, the release device is controlled hydraulically, and comprises a body supported on the base and a stop for action on the friction clutch.

According to one embodiment, fins are provided in a portion of the sleeve.

According to one embodiment, it comprises a ring for retention of the release device which penetrates in the sleeve and is provided with at least one lug for securing on the flange.

According to one embodiment, the end of the ring which penetrates into the sleeve has a support collar on the body of the release device.

According to one embodiment, an annular form is arranged in the support in order to form a hydraulic circuit.

According to one embodiment, an opening is arranged in the support in order to permit the passage of the air.

According to one embodiment, the collar is inclined axially in order to exert preloading on the body of the release device.

According to one embodiment, the retention ring comprises a cut-out or an appendix for co-operation respectively with an appendix or a cut-out belonging to the body of the release device for blocking of the said body in rotation.

According to one embodiment, the retention ring has a passage for a supply tube of the hydraulically controlled stop.

According to one embodiment, the flange of the support comprises a hollow for retention of the said supply tube.

According to one embodiment, the assembly comprises a rotor support hub which is secured at the rear end of the intermediate shaft on the torsion damper.

According to one embodiment, the rotor support hub has a reduced thickness at the front for penetration with radial play of the sleeve in the interior of the hub.

According to one embodiment, the hub comprises an inner rim with globally transverse orientation for its securing on the rear end of the intermediate shaft.

According to one embodiment, the intermediate shaft has at its rear end a centring support surface for the inner rim of the hub and an axial stop for the inner rim.

According to one embodiment, the axial stop and the inner rim are perforated for the passage of units for securing of the inner rim on the intermediate shaft.

According to one embodiment, the torsion damper comprises at the front a first guiding washer and at the rear a second guiding washer which are integral with one another. In addition, according to this embodiment, the two guiding washers are disposed on both sides of a hub flange which is configured to be connected to an output hub integral in rotation with the input unit of the gearbox, the first guiding washer being secured at its inner periphery on the inner rim of the rotor hub.

According to one embodiment, the said securing units pass through the first guiding washer and the inner rim for securing of the first guiding washer and the rotor hub on the axial stop of the intermediate shaft.

According to one embodiment, the inner periphery of the first guiding washer is offset axially at the front in order to create axial play between the first guiding washer and the rear end of the rotor.

According to one embodiment, the first guiding washer comprises clefts for fitting of resilient units such as helical springs which act circumferentially between the flange and the guiding washers.

According to one embodiment, the first guiding washer has on its outer periphery a curved rim which faces towards the rotor, such as to create a deflector.

According to one embodiment, the deflector is positioned in the interior of the interconnector.

According to one embodiment, the rotor hub is extended at the rear by a flange. This is for example an anti-dust flange which can be integral with the first and/or the second guiding washer.

According to one embodiment, the inner periphery of the flange is offset axially rearwards relative to the inner rim.

According to one embodiment, an opening is provided in the flange in order to permit the passage of the air.

According to one embodiment, the outer periphery of the flange is offset axially rearwards relative to the inner periphery of the flange.

According to one embodiment, the outer periphery of the flange has an inclined end in the direction opposite the rotor.

According to one embodiment, the inclined end is positioned in the interior of the interconnector.

According to one embodiment, the flange is formed between its inner and outer peripheries such as to follow the profile of the clefts in the first guiding washer.

According to one embodiment, the support bears a magnetic stopper at the rear of the interconnector, in order to receive the metal particles derived from the torsion damper.

According to one embodiment, the double damping flywheel comprises primary and secondary engine flywheel units which are substantially coaxial, mobile in rotation relative to one another, and coupled by means of first and second damping means which are arranged in series by means of a connection flange.

According to one embodiment, the first damping means comprise at least one curved resilient unit which extends circumferentially between two first support seats supported by the connection flange.

According to one embodiment, the second damping means comprise at least two sets of resilient units, each comprising at least two straight resilient units which are arranged in series by means of an intermediate support element, each set of straight resilient units extending circumferentially between two second support seats which are supported by the connection flange, with at least one annular unit for phasing of the straight resilient units, distinct from the connection flange, bearing the intermediate support element of each set.

According to one embodiment, the friction clutch is a diaphragm clutch comprising a reaction plate which belongs to the double damping flywheel, and a clutch mechanism comprising a first globally annular part known as the cover, a second globally annular part known as the diaphragm with a peripheral part which forms a Belleville washer, and a central part which is fragmented into radial fingers, with assembly means fixing the said diaphragm on the said cover in a pivoting manner, and a third annular part, known as the pressure plate, which is integral in rotation with the cover, whilst being mobile axially relative to the latter, and on which the diaphragm is supported by its peripheral part which forms a Belleville washer.

According to one embodiment, by means of its cover, a clutch mechanism of this type is suitable for being added onto the reaction plate of the double damping flywheel, with insertion between this reaction plate and the pressure plate of a friction disc which is integral in rotation rigidly or resiliently with the intermediate shaft.

According to one embodiment, the release device can act on the radial fingers of the diaphragm in order to control release of the clutch, which is normally engaged, with the pressure plate clamping the friction disc against the reaction plate under the thrust by the peripheral part of the diagram which forms a Belleville washer.

BRIEF DESCRIPTION OF THE DRAWINGS

The invention will be better understood by reading the following description and examining the accompanying figures. This description and these figures are provided purely by way of illustration of the invention which is in no way limiting.

FIG. 10 is a partial view on an enlarged scale of FIG. 2.

FIG. 11 is a view in perspective of the anti-dust flange in FIGS. 2 and 3.

DESCRIPTION OF EMBODIMENTS OF THE INVENTION

Figure 1:
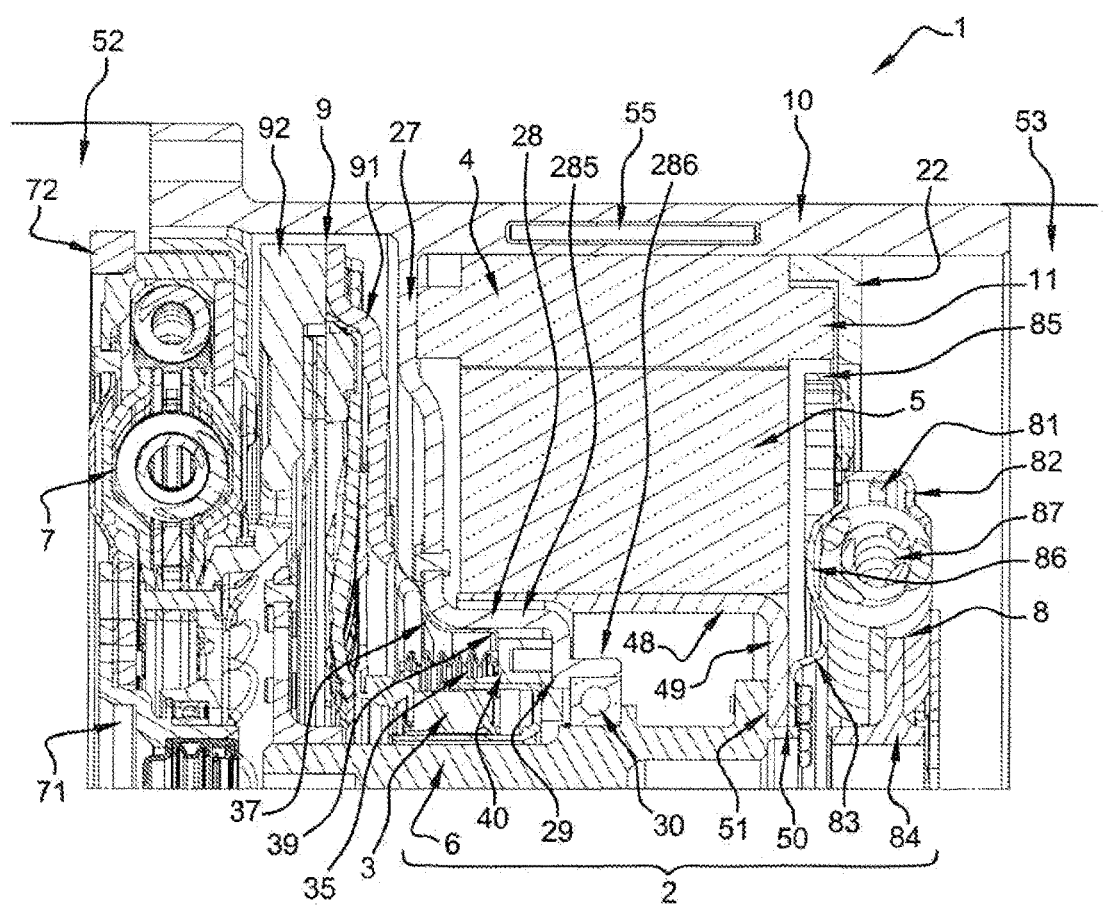
FIG. 1 is a half view in axial cross-section of the transmission assembly for a motor vehicle according to the invention, a using a rotor support hub which is provided with an inner rim for securing on the intermediate shaft and on one of the guiding washers of the torsion damper.

FIG. 1 shows a transmission assembly 1 for a motor vehicle interposed between the gearbox 53 and the thermal engine 52 of the motor vehicle. This assembly 1 comprises a clutch 9, a clutch 9 release device 3, a reversible rotary electrical machine 4 provided with a rotor 5 which has a central opening, an intermediate shaft 6 between the clutch 9 and the rotor 5 of the electrical machine 4, the said shaft bearing the release device 3 and penetrating into the central opening in the rotor 5. The assembly 1 is an assembly for transmission of movement between the crankshaft of the thermal engine 52 and the movement input unit 54 of the gearbox 53.

The axis X-X of the shaft 6 constitutes the axis of rotation of the assembly 1. The terms radial, axial and transverse are to be considered relative to the axis X-X. The surfaces of the parts which face in the direction of the thermal engine 52 will be known as the front surfaces, whereas the surfaces of the parts which face in the direction of the gearbox 53 will be known as the rear surfaces. The front end of a part thus faces towards the engine 52, whereas the rear end of a part faces towards the gearbox 53. Thus, the intermediate shaft 6 bears at the front the release device 3, and at the rear, according to one characteristic, it bears a torsion damper 8. According to one embodiment, the gearbox 53 is an automatic gearbox.

According to one embodiment, the automatic gearbox 53 comprises in a conventional manner planetary gear trains in cascade. Making certain parts of these trains integral by means of clutches or brakes provides different transmission ratios. The selection of a ratio then depends only on a combination of the order of the control pistons. Thus, there is no positive interlocking to control. A high-pressure hydraulic pump, which is incorporated in the box and is driven directly by the thermal engine, is responsible for supplying the energy for the hydraulic actuators necessary for the clutches and the brakes.

The positions of the gear selector are indicated in a known manner by the initials of the corresponding terms P(ark) for a parked vehicle, R(everse) for reverse travel, N(eutral) for neutral, and D(rive) for normal forward travel.

According to one embodiment, the automatic box comprises a torque converter at its input.

According to one embodiment, the input unit 54 of the gearbox is thus the input shaft of the gearbox. As a variant, it consists of a driver, which is connected in a known manner by resiliently deformable tongues to the housing of the torque converter which bears the drive wheel of the unit. As a variant, the input unit 54 consists of a driver which is connected by a ribbed connection to the housing of the torque converter.

As a variant, the automatic gearbox has continuously variable transmission (CVT), such as transmission comprising two variable pulleys, and a belt with pins which intervenes between the two pulleys.

As a variant, the automatic gearbox is a robotised controlled gearbox such as a double clutch box as described for example in patent US 2011/0259698 to which reference will be made.

According to one characteristic, the movement transmission assembly 1 comprises a dry friction clutch 9 provided with a reaction plate 91.

According to some embodiments, the clutch 9 is a friction clutch which functions in dry conditions, and the transmission assembly 1 comprises at the front a double damping flywheel 7, and at the rear a torsion damper 8. The rotor 5 of the electrical machine 4 is secured on the torsion damper 8.

More specifically, the double damping flywheel 7 is configured to be secured at the front on the crankshaft of the thermal engine of the vehicle, and to form the reaction plate 91 of the dry friction clutch 9. The torsion damper 8 is configured to be connected in rotation to the input unit 54 of the gearbox 53. In FIG. 1, the unit 54 is the input shaft of the automatic gearbox.

Figure 2:
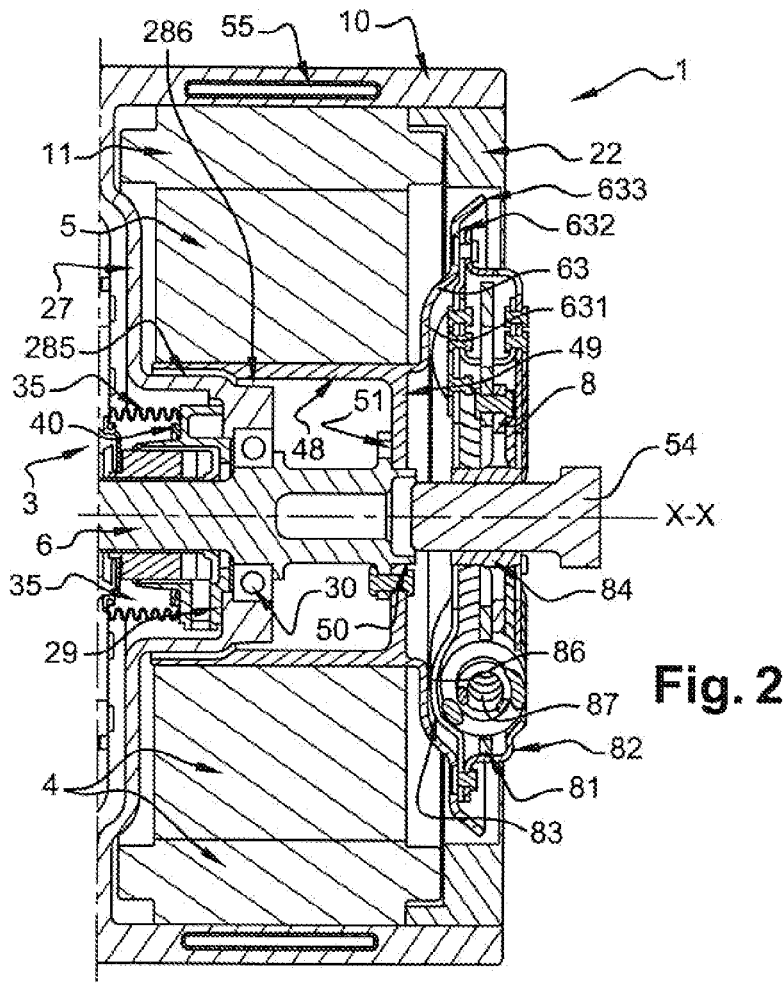
FIG. 2 is a partial view in axial cross-section showing the reversible rotary electrical machine, as well as the torsion damper and the intermediate shaft of the transmission assembly for a second embodiment using a rotor support hub which is provided with an anti-dust flange for protection of the electrical machine secured on one of the guiding washers of the torsion damper.
Figure 3:
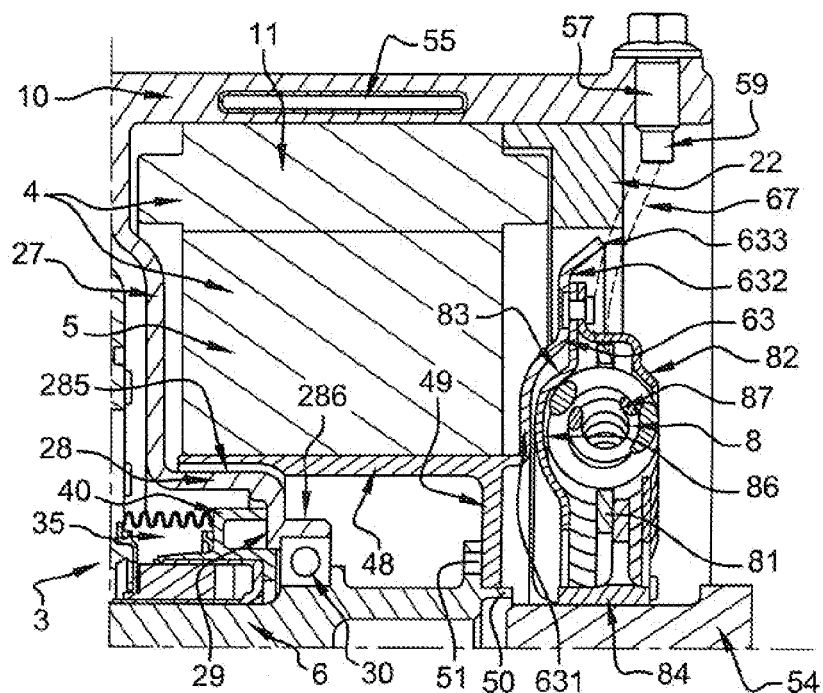
FIG. 3 is a view similar to FIG. 2 showing a variant of FIG. 2 with a magnetic stopper to receive magnetic particles derived in particular from the torsion damper.
Figure 12:
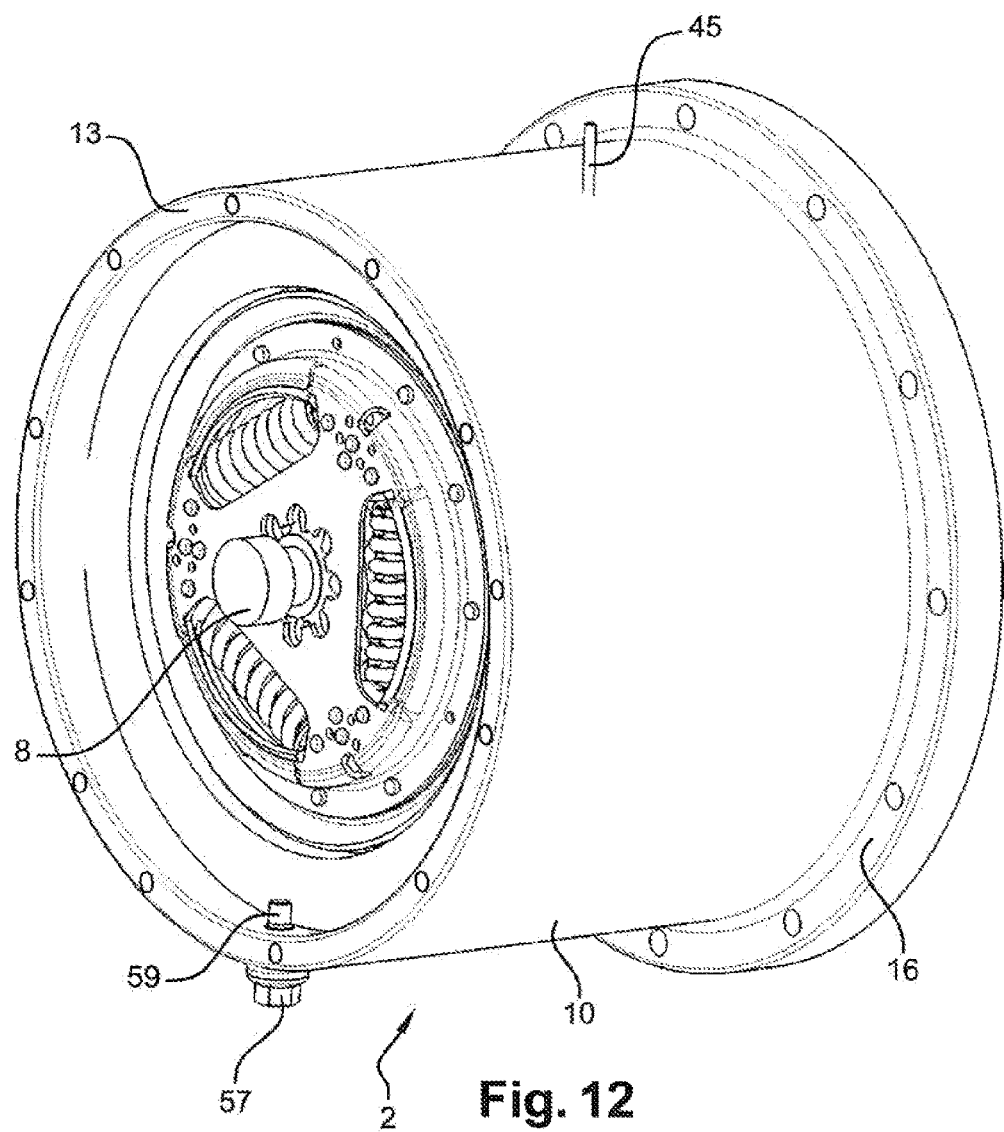
FIG. 12 is a view in perspective of the support of the hybrid module of the transmission assembly according to the invention, showing the rear surface of the transmission assembly as well as the end of the supply tube of the hydraulically controlled release stop and the magnetic stopper in FIG. 3.
Figure 13:
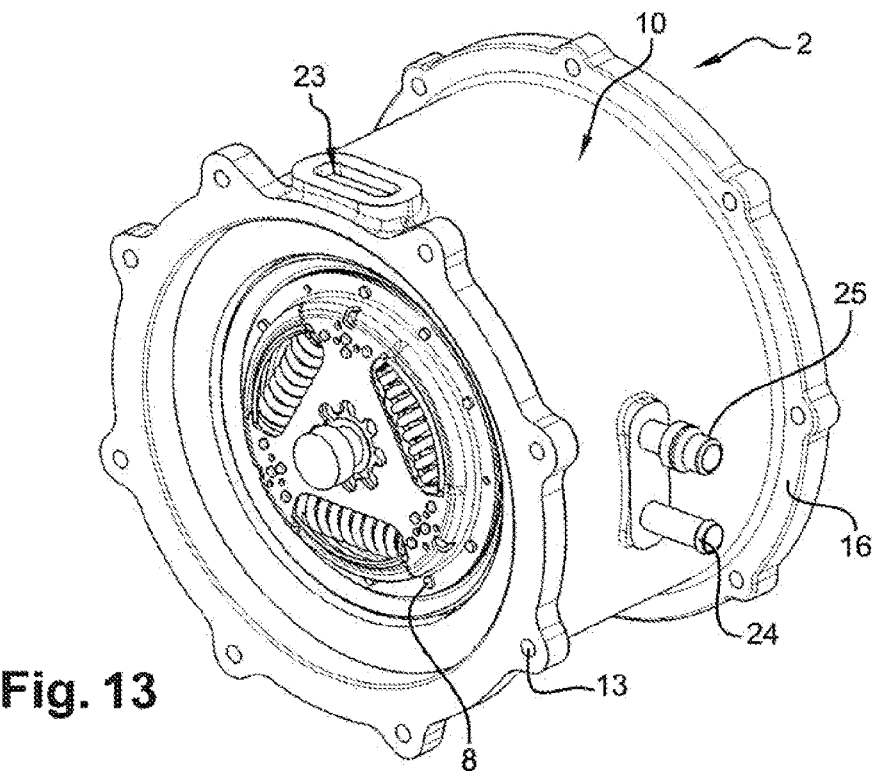
FIG. 13 is a view similar to FIG. 12 for another variant embodiment of the support of the hybrid module.

In the figures, the damper 8 comprises in a conventional manner at least two coaxial parts which are fitted such as to be mobile relative to one another against resilient means with circumferential action, such as helical springs 87 which can be seen better in FIGS. 12 and 13. One of the coaxial parts comprises a flange 81, and the other part comprises two guiding washers 82, 83 which are disposed on both sides of the flange 81. The washers 82, 83 and the flange 81 are made of metal, such that metal particles can become detached and pollute the electrical machine 4. Friction means can be provided between the two coaxial parts, as can be seen for example in FIG. 1 of document DE 101 03 795. Non-metal particles can become detached and also pollute the machine 4. According to one characteristic, anti-dust means, such as the flange 63 in FIGS. 2 and 3, are provided in the manner described hereinafter.

In the figures, the flange 81 is integral rigidly with a hub 84 which is ribbed on the interior and is engaged with complementary ribbing on the input unit 54 of the gearbox.

According to one characteristic, the front guiding washer 83, which is closest to the rotor 5, is configured in a manner described hereinafter to be connected in rotation to the rotor 5. The flange 81 and the washers 81, 83 have receptacles for the resilient units. In the figures, the flange 81 has windows for receipt of the resilient units 87, the guiding washer 83 which is closest to the rotor 5, known as the first guiding washer, has clefts for receipt of the units 87, and the other guiding washer 82, known as the second guiding washer, has windows for receipt of the units 87. As a variant, the second guiding washer also has clefts. As a variant, the first washer 83 has windows. It will be appreciated that the clefts prevent dust from polluting the rotor 5. In the figures, the second guiding washer 82 has peripheral lugs with axial orientation which extend on the exterior of the flange 81, for assembly with the first washer 83. The lugs can be secured by crimping with the first washer (FIG. 1). As a variant (FIGS. 2 and 3), the lugs have at their free end a radial rim for securing by riveting with the washer 83. According to one characteristic, the rivets permit assembly of the washers with the flange 63.

The solution is economical, since it uses a double damping flywheel 7, a dry friction clutch 9, and a torsion damper 8, which can be mass-produced components. In addition, the radial size of the rotary electrical machine 4 can be reduced, since it is implanted axially between the damper 8 and the assembly of the double damping flywheel 7-friction clutch 9, which can be a conventional diaphragm clutch.

As a reminder, a diaphragm clutch comprises a pressure plate, a reaction plate, and a friction disc which has on its outer periphery friction linings which are designed to be clamped between the pressure and reaction plates under the action of a diaphragm supported on a cover which is integral with the pressure plate. The pressure plate is connected to the cover by tangential tongues which permit axial movement of the pressure plate relative to the cover. The cover—pressure plate—diaphragm assembly is known as the clutch mechanism.

The friction disc can belong to a torsion damper comprising in the aforementioned manner at least two coaxial parts which are fitted such as to be mobile relative to one another against resilient means with circumferential action. One of the coaxial parts can comprise a flange, and the other part can comprise two guiding washers which are disposed on both sides of the flange. The friction disc can be integral for example with one of the guiding washers. The flange can be integral with a hub which is ribbed on the interior in order to be connected in rotation to the intermediate shaft 6 which has complementary ribbing for this purpose. A damper of this type with friction means can be seen in FIG. 1 of document DE 101 03 795.

In the embodiment in FIG. 1, the friction disc 93 can be rigid, i.e. it can be without a torsion damper. This disc 93 can have on its outer periphery friction linings (without a reference) disposed on both sides of the disc 93. This disc 93 can be configured to have resiliently deformable portions on its outer periphery for clamping of the friction linings progressively between the reaction plate 92 and the pressure plate which belongs to the clutch mechanism 91. The disc 93 can be secured at its inner periphery, for example by riveting, on a hub 94 in the form of an "L" which is ribbed on the interior in order to be connected in rotation to the intermediate shaft 6 which has complementary ribbing for this purpose.

The clutch mechanism 91 can be of the type described in document FR 2 473 140 to which reference will be made. Thus, the diaphragm has a peripheral part in the form of a Belleville washer which is extended towards the interior by a plurality of fingers. Assembly means fix the said diagram on the said cover in a pivoting manner. These means, such as small columns or lugs, pass through the diagram at the level of the inner periphery of the Belleville washer. These means bear a secondary support opposite a primary support such as a joining piece of the cover, or a rod. These means can comprise a device for wear adjustment as described in document DE 101 03 795. Resiliently deformable tongues connect the cover to the pressure plate.

To summarise, the friction clutch 9 is a diaphragm clutch comprising a reaction plate which belongs to the double damping flywheel, and a clutch mechanism 91 comprising a first globally annular part known as the cover, a second globally annular part known as the diaphragm, with a peripheral part which forms a Belleville washer, and a central part which is fragmented into radial fingers, with assembly means fixing the said diaphragm on the said cover in a pivoting manner, and a third annular part known as the pressure plate, which is integral in rotation with the cover whilst being mobile axially relative to the cover, and on which the diaphragm is supported by means of its peripheral part which forms a Belleville washer.

By means of its cover, a clutch mechanism of this type is designed to be added onto the reaction plate of the double damping flywheel 7, with insertion between this reaction plate and the pressure plate of a friction disc, which is integral in rotation rigidly or resiliently with the intermediate shaft 6.

A clutch device 3 can act on the radial fingers of the diaphragm, in order to control release of the clutch, which is normally engaged, with the pressure plate clamping the friction disc against the reaction plate under the thrust by the peripheral part of the diaphragm which forms a Belleville washer. In order to release the clutch, in this embodiment it is necessary to act by thrusting axially on the fingers of the diaphragm by means of the device 3, in order to make the diaphragm tilt.

In the embodiments represented, the device 3 is without a release fork, for reduction of the axial dimension of the assembly. The device 3 is of the concentric type, with the intermediate shaft 6 passing through it. It comprises a release stop 35.

According to one embodiment, the release stop 35 can belong to a concentric release device controlled by a cable, this stop then being fitted on a driven part which is mobile in translation and fixed in rotation, the said part being in a nut-screw relationship with a drive part which is fixed in translation and mobile in rotation. The drive part bears a pulley around which the control cable is wound. For further details reference will be made to document U.S. Pat. No. 5,141,091.

As a variant, the release stop 35 belongs to an electrically controlled concentric release device.

As a variant, the release stop 35 belongs to a hydraulically controlled concentric release device. The concentric release device of the hydraulic type comprises two parts in a piston-cylinder relationship, i.e. a fixed part which delimits a blind annular cavity with axial orientation, and a piston which is fitted such as to be mobile axially relative to the fixed part.

This piston the bears the release stop 35, and penetrates into the cavity in order to define with the latter a work chamber with a variable volume, with the cavity communicating by means of a channel with a duct which is connected to a master cylinder activated by a release pedal, or by an actuator with an electric motor, which is controlled according to programmes predetermined by a computer. The work chamber can therefore be pressurised or depressurised, with the control fluid which fills the said chamber usually being oil.

The channel can be hollowed in a flange 27 which belongs to a support 10 described hereinafter. As a variant, the channel can belong to a tube 45 supported by the flange 27, which for this purpose can have a hollow. The tube 45 can also be supported by the retention ring 37 described hereinafter.

The fixed part of the hydraulic release device 3 can be made of mouldable material in a single piece.

For reduction of the radial dimension, the fixed part of the hydraulic release device 3 can comprise two coaxial parts, i.e. an outer body 40 (FIG. 1) surrounding a metal guide tube which is longer axially than the outer body. The base of the cavity will be delimited by a transverse rim which belongs to the tube-guide assembled on the outer body 40 by means of an intermediate assembly part. A static bellows seal (FIGS. 1 to 3) is provided between the outer body and the tube-guide, which bears on its free end a stop in order to limit the displacement of the piston when the release device 3 is not fitted on the flange 27.

As a variant, the tube-guide has a cross-section in the form of a "U" assembled by being snapped into the body 40, having for this purpose on its free end a plurality of resiliently deformable lugs in the form of hooks which penetrate into hollows in the tube-guide (FIG. 1). These hollows are provided in the outer branch of the tube-guide with a cross-section in the form of a "U", the said outer branch being shorter than the inner branch of the "U" as can be seen in FIG. 1.

The body 40 can be assembled by riveting on a base 29 of a sleeve 28, described hereinafter, which the flange 27 has.

As a variant, the body 40 can be assembled by bayonet fitting with a base 29 of a sleeve 28, described hereinafter, which the flange 27 has.

As a variant, the body 40 can be assembled by bayonet fitting on the base of the flange 27 by means of shouldered rivets.

As a variant, the body of the release device is maintained supported on the base by means of a retention ring 37 described hereinafter.

A preloading spring acts between the outer body made of mouldable material and the release stop 35, in order to maintain the latter supported constantly on the release means, in this case the inner end of the fingers of the diaphragm of the clutch 9.

The release stop 35 is in this case of the self-centring type, and comprises a ball bearing with a profiled rotary ring for intermittent contact with the inner ends of the fingers of the diaphragm, and a non-rotary ring which is coupled axially with the piston 32 which causes the stop 35 to be self-centred. For further details on the self-centring of the stop, reference will be made for example to document FR 2 619 880, with the inner or outer ring of the bearing being rotary, and profiled on the inner end of the fingers of the diaphragm.

As a variant, the release device is of the drawn type, with the stop acting by drawing on the fingers of the diaphragm, which is supported on the primary support of the diaphragm which the cover bears. In this case no secondary support is provided.

Figure 14:
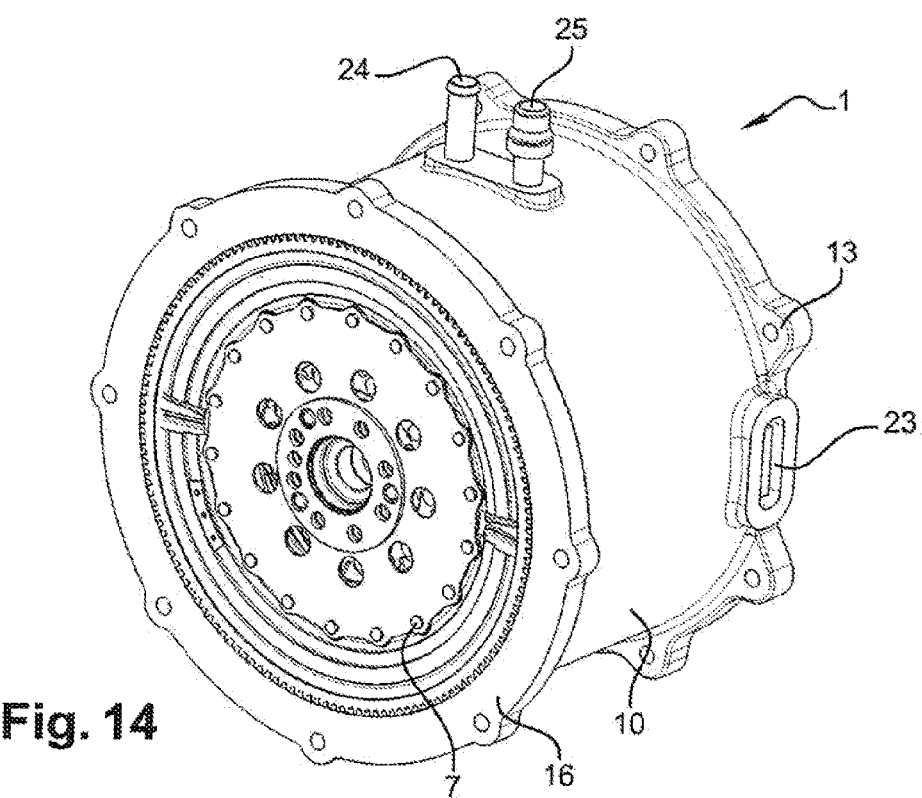
FIG. 14 is a view similar to FIG. 13 showing the front surface of the transmission assembly according to the invention.
Figure 15:
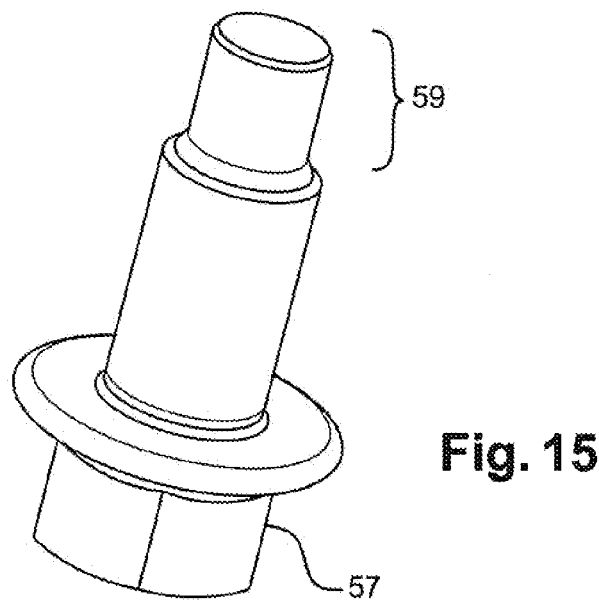
FIG. 15 is a view in perspective of the magnetic stopper in FIG. 3.

The double damping flywheel 7 comprises primary and secondary engine flywheel units which are substantially coaxial, and mobile in rotation relative to one another by means of a bearing means, such as a ball bearing which can be seen in FIG. 1, or a plain bearing, as can be seen in FIG. 1 of document DE 10 2011 107 144. In a known manner, the primary unit is designed to be secured on the crankshaft of the thermal engine 52 by means of screws which can be seen for example in documents DE 101 03 795, DE 10 2011 107 144 and WO 2010/079273. Thus, FIG. 14 shows a ring which is perforated centrally, and is provided with holes for passage of the securing screws, the double damping flywheel 7 being of the type described in document WO 2010/079273, to which reference will be made for further details. This ring belongs to the primary unit comprising a flexible primary flywheel which in this case comprises a flexible plate disc bearing on its outer periphery an inertia disc which bears a toothed starting crown for engagement in a manner described hereinafter with a starter.

The secondary unit comprises the cast iron reaction plate 92 of the friction clutch 9. On its inner periphery, this reaction plate has a hub so that in this case it can be fitted on the outer ring of the ball bearing interposed between the primary and secondary units.

According to one embodiment, resilient means such as helical springs intervene between the two units in association with a torque limiter.

According to another embodiment described in documents DE 101 03 795, DE 10 2011 107 144 and WO 2010/079273, at least one set of curved helical springs with a longer circumferential length intervenes between the two, primary and secondary units.

According to another embodiment, also described in these documents DE 101 03 795, DE 10 2011 107 144 and WO 2010/079273, two sets of helical springs are provided.

In the embodiment in FIG. 1, the two primary and secondary engine flywheel units are substantially coaxial, mobile in rotation relative to one another, and coupled by means of first and second damping means arranged in series by means of a connection flange.

The first damping means comprise at least one curved resilient unit which extends circumferentially between two first support seats supported by the connection flange.

The second damping means comprise at least two sets of resilient units, each comprising at least two straight resilient units which are arranged in series by means of an intermediate support element, each set of straight resilient units extending circumferentially between two second support seats which are supported by the connection flange, with at least one annular unit for phasing of the straight resilient units, which is distinct from the connection flange, bearing the intermediate support element of each set. A torque limiter and sealing means for the springs are also provided. For further details reference will be made to document WO 2010/079273.

Figure 6:
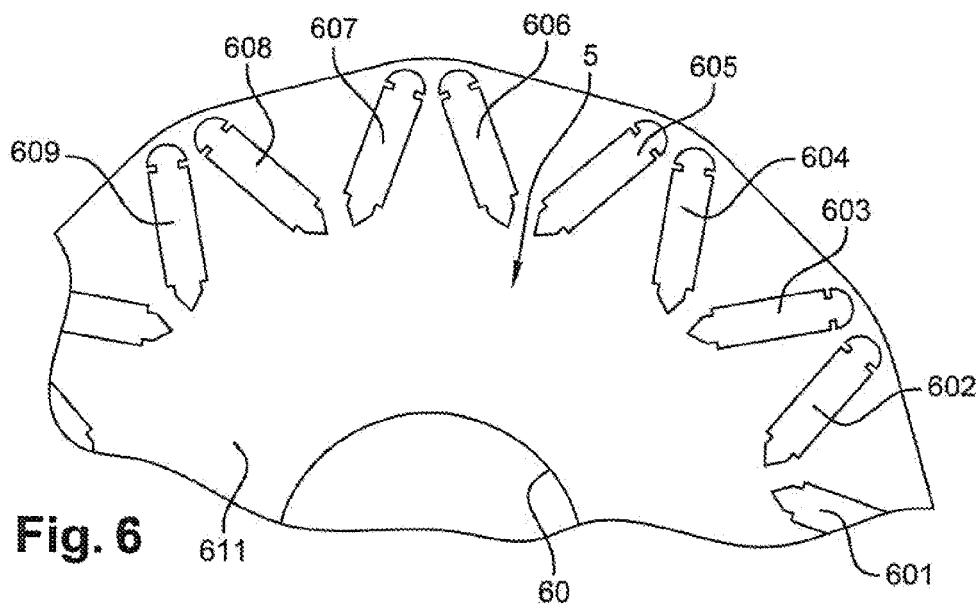
FIGS. 6 and 7 are partial views of one of the plates of the set of plates of the rotor which are equipped with permanent magnets for two embodiments.
Figure 7:
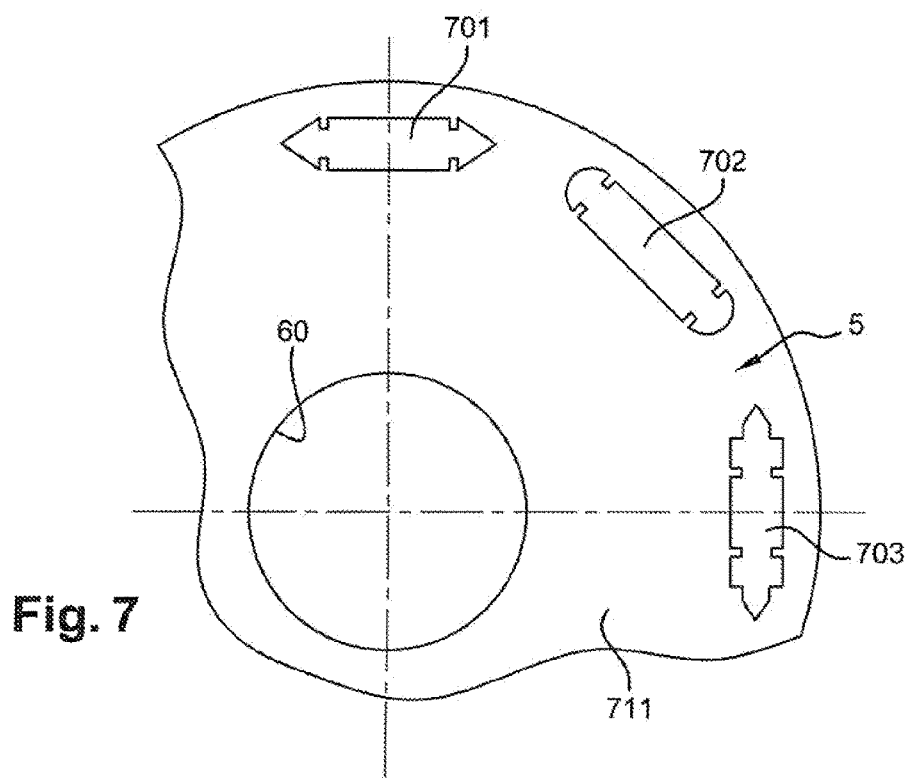
Figure 8:
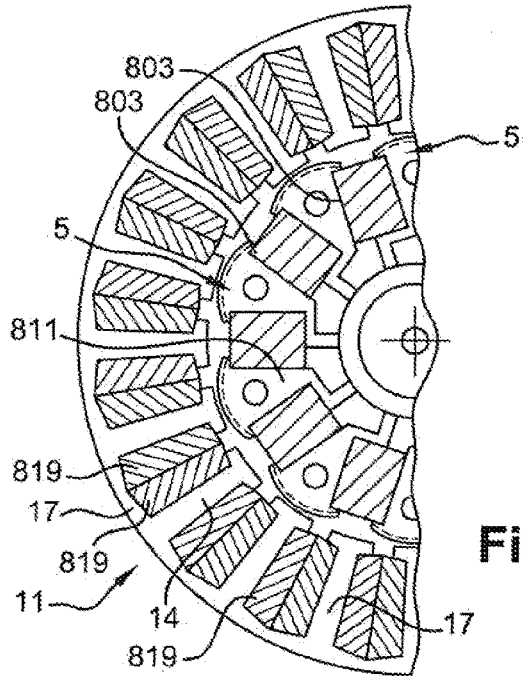
FIG. 8 is a partial front view of the stator and the rotor of the rotary electrical machine for yet another embodiment.

According to this embodiment, the machine 4 is an asynchronous machine, the rotor 5 of which is provided with permanent magnets. More specifically, in a known manner, in order to reduce Foucault currents, the rotor 5 comprises a body in the form of a set of plates, one of which has the references 611, 711 and 811 respectively in FIGS. 6, 7 and 8. In FIG. 6, the permanent magnets 602 to 610 are implanted in the form of a "V" in the plates of the set of plates. In FIG. 7, the permanent magnets 702 to 705 are implanted in a surface manner on the outer periphery of the plates 711 of the set of plates. In FIG. 8, the permanent magnets 803 are implanted radially in the plates 811 of the set of plates, with the rotor being subject to concentration of flux. The permanent magnets are implanted in associated openings in the set of plates. These openings are prolonged by orifices, with no references in FIGS. 6 and 7, in order to decrease the leakages of the magnetic flux.

According to one embodiment, the permanent magnets are permanent magnets made of rare earth, for example neodymium-iron-boron, or are based on samarium. These magnets can contain a greater or lesser proportion of dysprosium. According to another embodiment, the permanent magnets are less costly ferrite magnets. A plurality of permanent magnets can be fitted in a single opening in the set of plates.

Figure 4:
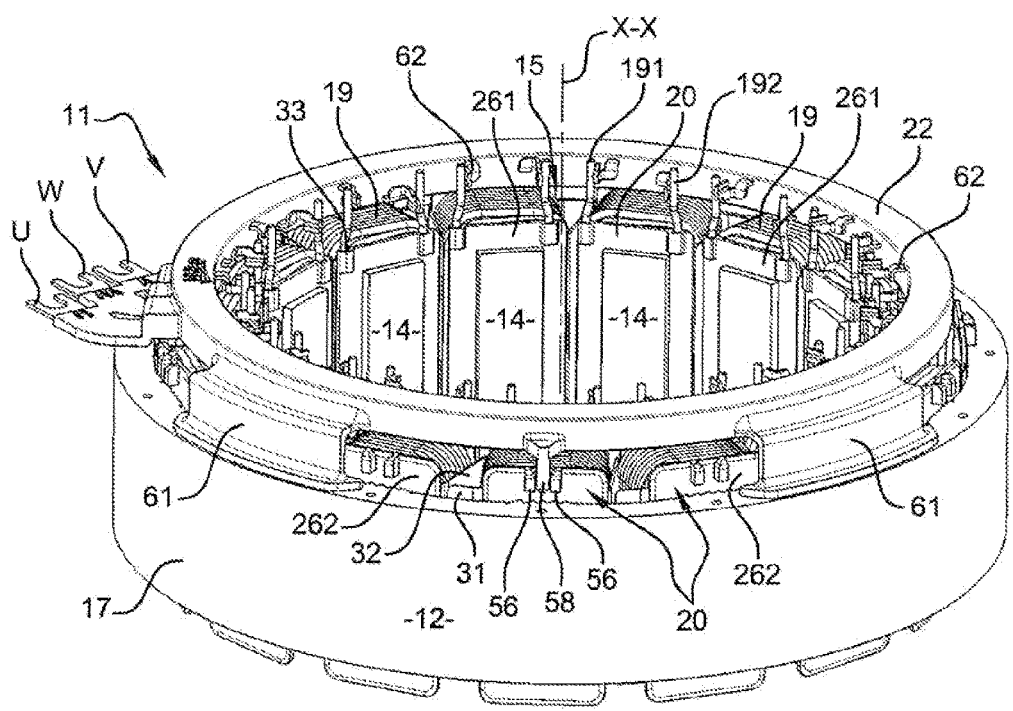
FIG. 4 is a view in perspective showing an embodiment of the stator of the reversible rotary electrical machine in the form of an alternator-starter.
Figure 9:
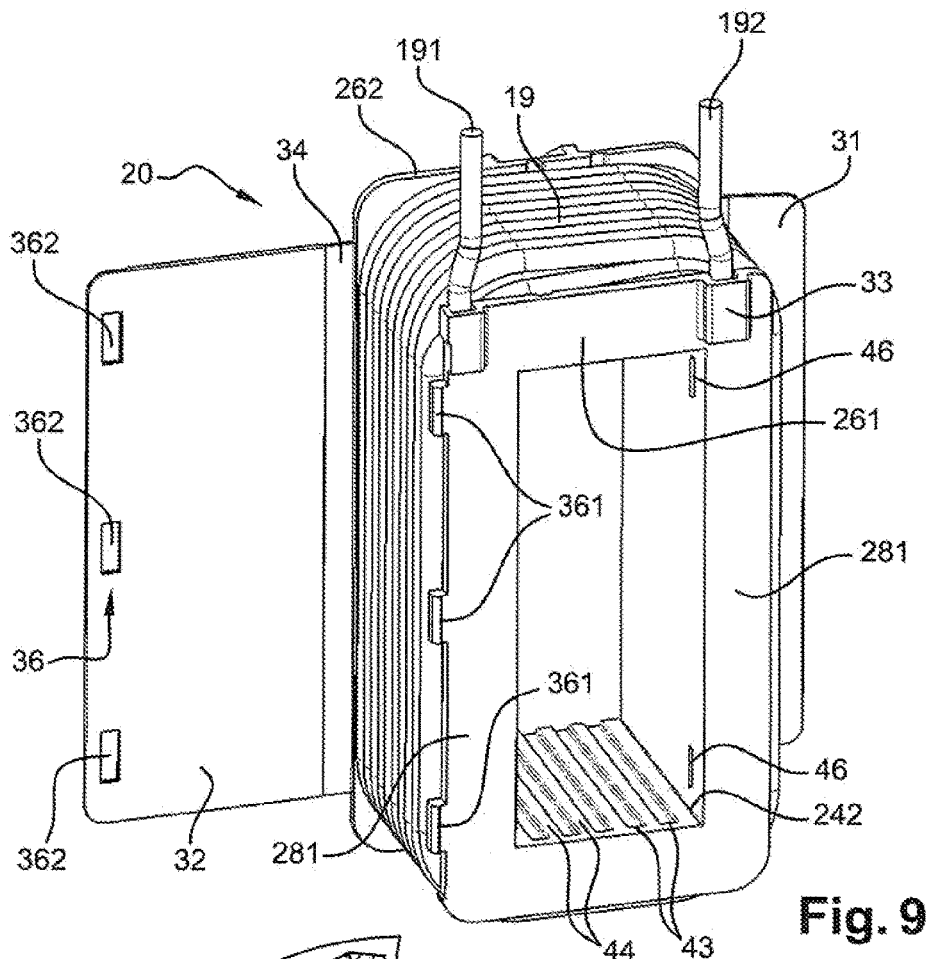
FIG. 9 is a view in perspective of one of the coils in FIG. 4 with its coil insulator in the deployed position before fitting on the tooth concerned of the stator.

As can be seen better in FIGS. 4 and 9, in this embodiment the stator 11 belongs to a polyphase rotary electrical machine comprising a stator winding provided with a plurality of concentric coils 19, which in this case are preformed, and a neutral point, known as the neutral of the machine, which can be seen for example in FIG. 1 of document EP 0 831 580. This stator is compact and high-performance from the point of view of the power of the electrical machine.

This stator is described in application FR 12/55770 filed on 20 Jun. 2012, to which reference will be made for further details. The coils 19 are interconnected to one another by means of a compact interconnector 22 comprising a plurality of frames, one of which, known as the neutral frame, is connected to the neutral of the rotary electrical machine. This stator 11 comprises a body with an annular form, with an axis which is combined with the axis X-X. This body has teeth 14 which are distributed regularly on the inner periphery, as well as notches 15 which are open towards the interior, two consecutive notches 15 being separated by a tooth 14. These teeth 14 have edges which are parallel in pairs, with a strip of material, corresponding to the head 17, existing between the base of the notches 15 and the outer periphery of the body 12. The body is formed by a stack of plates made of ferromagnetic material which extends on a radial plane perpendicular to the axis X-X. The set of plates is retained by means of rivets (not represented) which pass axially from one side to the other of the stack of plates. This stack makes it possible to reduce the Foucault currents.

As can be seen in FIG. 9, preformed coils 19 which form the winding of the stator 11 are fitted on the teeth 14 of the stator. These coils 19 are produced from a wire which is wound around a plurality of turns. The wires consist of an electrically conductive wire, for example a copper and/or aluminium wire coated with an electrical insulator, such as enamel. The wires can have a circular or rectangular cross-section, or they can have a flattened form.

According to one embodiment, two coils 19 are implanted in a single notch 15, each coil 19 being wound around one of the metal teeth 14 which delimit the notch by means of a coil insulator 20. This insulator 20 is an electrical insulator, which in this embodiment is made of electrically insulating and mouldable material. The ends 191, 192 of each coil 19 extend axially from the winding on a single side of the stator 11, corresponding to the upper side of the stator 11. Preferably, the ends 191, 192 of the coils 19 are situated substantially according to the same circumference, on the free end side of the teeth 14, i.e. on the side which is distant from the head 17, and on the side which is closest to the air gap between the inner periphery of the stator and the outer periphery of the rotor which the electrical machine comprises. Each coil 19 comprises a first end 191 known as the input end, which is designed to be connected to the other inputs in an alternating manner in order to belong to one of the phases, each having a terminal respectively U, V, W of the machine, and a second end 192 known as the output end, which is designed to be connected to the neutral of the electrical machine. For this purpose, the coils 19 are interconnected to one another in order to form the different phases by means of a compact interconnector 22 with an axis X which is combined with the axis X-X when the interconnector 22 is installed on the stator 11.

In this embodiment, this interconnector 22 comprises four frames with an annular form which extend according to a radial plane. The frames are electrically conductive, and are for example made of copper or advantageously of another weldable metal material. These frames have inner and outer diameters which are substantially identical. The outer diameter of the frames, corresponding substantially to the outer diameter of the interconnector 22, is smaller than the outer diameter of the stator 11, constituted by the outer diameter of the head 17, in order to facilitate an operation of impregnation of the coils 19, and reduction of the dimension of the diameter. These frames are stacked axially on one another and insulated electrically against one another. Each frame bears on its inner periphery apparent lugs (with no reference in FIG. 4), which extend projecting radially towards the interior of the frame for the welding of the ends 191, 192 of the coils of the stator. Preferably, the frames are embedded in a body made of electrically insulating material such as plastic material. A layer of electrically insulating material is present between each frame.

One of the frames, known as the neutral frame, is designed to be connected to the neutral of the winding of the electrical machine comprising the coils 19, which in this case are arranged according to fitting in a star form, with a neutral point constituted thanks to the neutral frame. This neutral frame is situated at one end of the stack of frames, in this case at the end which is furthest from the head 17. Since each coil 19 has an output end 192 which is connected to the neutral, the neutral frame comprises a number of lugs which is equal to the number of coils 19, and in this case is equal to 15.

The three other frames, known as the phase frames, are each designed to be connected to the inputs 191 of the coils 19 of the phase concerned of the electrical machine, which in this case is of the three-phase type.

It will be appreciated that in another embodiment, it is possible to increase the number of phase frames according to the number of phases of the machine 4. Thus, according to one embodiment, the number of phase frames is equal to five or six, the machine then being of the five-phase or six-phase type.

The input ends 191 of the coils 19 are thus connected alternately circumferentially to the phase outputs of the winding of the electrical machine by means of one of the phase frames of the interconnector 22. The phase frames each comprise a number of lugs which is equal to the number of coils divided by the number of phases of the machine, i.e. in this case 15/3=5 (cf. FIG. 4). More specifically, each phase comprises five coils 19 which are connected electrically to one another by one of the phase frames, the number of lugs 36 of which is equal to five.

For this purpose, each phase frame comprises on its outer periphery a connection terminal for interconnection with a power connector (not represented), which itself is connected to an inverter described for example in document EP 0 831 580. As a variant, inverter is controlled by signals, as in document FR 2 745 444.

In some embodiments, the rotary electrical machine is a reversible alternator known as an alternator-starter, which can function in alternator mode or in starter mode. This machine therefore makes it possible to start the thermal engine, and to function in alternator mode, in particular in order to recharge the battery of the vehicle, and/or to supply the energy consumers with power when the thermal engine is running, the clutch 9 then being engaged. This electrical machine is configured in order to stop the thermal engine, for example at a red light or in traffic jams, and then to restart it (stop and go function). It makes it possible to prevent the thermal engine from stalling by providing additional power (boost function), the clutch 9 then being engaged. It makes it possible to drive the vehicle at least for a short distance, the clutch 9 then being released, and the thermal engine stopped. It is configured to recuperate energy during the braking of the vehicle.

In the light of the figures, it can be seen that the double flywheel has at the front and on its outer periphery a toothed crown (with no reference) in order to engage with the pinion of a starter. This starter can be supplementary, in order to start the motor vehicle in very cold conditions as described in document FR 2 797 472, to which reference will be made.

In the light of the aforementioned documents, it can be seen that, in this embodiment, the connection terminals of the phases U, V, W of the machine 4 are configured to be connected to a command and control unit by a connection cable. Sensors can thus be provided, such as Hall-effect sensors, associated with a magnetic target such as a magnetic ring, in order to detect the angular position of the rotor 5. The magnetic ring can be supported by the front surface of the rotor 5, whereas the Hall-effect sensors can be grouped for example in threes, whilst being integrated in a sensor-holder which can be supported by the flange 27, described hereinafter, opposite the target. The command and control unit can be offset relative to, or as a variant it can be supported by, a support 10 described hereinafter. In all cases, with the clutch 9 engaged or released, good filtering of the vibrations is obtained by means of the flywheel 7 and the damper 8.

In the embodiment in FIGS. 4 and 9, the connection terminals U, V, W which are placed by side-by-side have an end in the form of a "U", and constitute the outputs of the phases of the winding with coils 19 of the machine. It will be appreciated that the terminals are simplified since they form part of the frames. These terminals U, V, W are rigid, and have a reduced size. They can be oriented as required.

The lugs of the different frames are offset angularly relative to one another. In addition, in order to have enough space to grip a lug and an end 191, 192 of a coil 19 by means of a welding electrode, an assembly formed by a lug of one of the phase frames and a lug of the neutral frame which are designed to be welded on the ends 191, 192 of a single coil 19, is configured such as to be positioned between the sides of each coil 19 which extend between the axial ends of the coil 19.

In addition, in this embodiment, the interconnector 22 comprises two pins 58, a single one of which can be seen in FIG. 4. During the fitting, these pins 58 permit indexing of the interconnector 22 relative to the coils 19, in order to reduce the risks of poor connections between the coils. These indexing pins 58 with axial extension are supported by an outer periphery of the interconnector 22. According to one embodiment, these pins comprise a base integral with the outer periphery of the interconnector 22 which bears a stem with a substantially cylindrical form with a bevelled free end. These indexing pins are designed to co-operate with guiding systems supported by the coil insulators 20. These guiding systems are formed by protuberances 56 which define a passage for an indexing pin 58.

The interconnector 22 also comprises support feet 61, which are designed to be supported on a rim of the head 17 of the stator 11. These support feet 61 have a shape in the form of an "L", with an end which is secured on the outer periphery of the body in which the frames are embedded, and an end which ends in a support 62 which is supported on the rim of the head 17.

In this case there are four support feet 61 distributed regularly around the body of the interconnector 22. The support feet 61 make it possible to retain the body of the connector 22 above the coils 19, without the body being in contact with the coils 19. In addition, the circumferential dimension of the feet 19 is small enough to prevent the interconnector 22 from covering entirely the outer periphery of the coils 19, thus facilitating the cooling of the stator 11 as a result of the large area of clearance between two successive support feet 61, and the space between the body of the interconnector 22 and the coils 19.

The coil insulator 20 is an electrical insulator which in this case is made of electrically insulating and mouldable material. The insulator 20 has a body comprising a frame with a globally rectangular form which is designed to be positioned around a tooth 14, in order to insulate the coil 19 electrically against the metal tooth 14. This frame (cf. FIG. 9) is formed by an upper wall and a lower wall 242 substantially perpendicular to the axis X-X, and two lateral walls which connect the upper and lower walls to one another. The lateral walls are parallel to the axis X of the stator 11.

The body of the insulator 20 additionally comprises (FIG. 9) a front rim 261 and a rear rim 262 which define a groove for fitting of the coil 19 together with the walls of the frame. The rear rim 262 is designed to be positioned in the vicinity of the head 17, whereas the front rim 261 is situated on the free end side of a tooth 14, i.e. on the outer periphery side of the rotor (not represented). In this case the body is made of rigid electrically insulating material, for example of plastic material such as PA 6.6, which can be reinforced by fibres, such as glass fibres.

Each rim 261, 262 comprises two longitudinal borders with the reference 281 for the front rim 261. These longitudinal borders form together with the lateral walls the part of the groove which receives the sides of a winding.

Each rim 261, 262 also comprises two borders which connect to one another the longitudinal borders of each rim 261, 262. These transverse borders form together with the upper and lower walls the part of the groove which receives the ends of the windings which extend axially on both sides of a tooth 14, and are known as chignons.

One of the longitudinal borders of the rear rim 262 is prolonged by a heel 31, whereas the other longitudinal border of the rear rim 262 is prolonged by a fin 32 via an area of connection 34 between the fin 32 and the rear rim 262. This area of connection 34 has a thickness smaller than the thickness of the rear rim 262, such as to constitute a folding area. The fin 32 can thus be folded in the direction of the body 23 of the coil insulator, according to the folding area 34, which extends longitudinally, perpendicularly to the upper 241 and lower 242 walls. Once it has been folded, the fin 32 constitutes an electrically insulating wall between two successive coils 19. The heels 31 make it possible to reduce the voltage losses between the head 17 and the coils 19.

According to one embodiment, the fin 32 is designed to be folded and left free. In this case, when the coil insulators 20 are fitted on the teeth 14, the fin 32 of a given insulator 20 is supported against a front rim 261 of an adjacent coil insulator 20.

According to another embodiment, the fin 32 is secured by means of a system for snapping into the longitudinal border 281 of the front rim 261 situated on the fin 32 side. As shown in FIG. 9, the snapping-in system can be formed by lugs 361 which are supported by the longitudinal border 281 of the front rim 261. These lugs 361 are designed to co-operate by snapping into windows 362 provided in the wall of the fin 32.

In addition (FIG. 9) in order to permit the passage of an impregnation varnish between the insulator 20 and the tooth 14 for securing of these two elements 14 and 20 to one another, blind slots 43 are provided in the surfaces of the upper walls of the frame opposite one another facing towards the interior of the insulator 20, i.e. facing respectively towards the upper and lower outer surfaces of the tooth 14. These slots 43 extend substantially perpendicularly to the front 261 and rear 262 rims. These slots 43 are closed, i.e. they do not open out on the front rim 261 side, in order to prevent the impregnation varnish from flowing into the interior part of the machine at the level of the air gap between its rotor and stator, when the varnish is injected from the open end of the slots 43 situated on the head 17 side. The inner surfaces of the upper and lower walls thus have alternation of slots 43 and ribs 44 situated between two successive slots 43.

In order to guarantee efficient retention of the coil 19 on the tooth 14 during the injection of the impregnation varnish in the interior of the slots 43, a fastening system ensures securing of the coil insulator 20 on the tooth 14. This fastening system is formed by fastening lugs 46 and slots with a shallow depth known as "pitting" provided in the tooth 14, in order to snap the lugs 46 in.

The interconnector 22 is secured on the stator 11 by welding of the lugs of the neutral frame and of the phase frames on the ends 191, 192 of the coils. The interconnector 22 is used in the manner described hereinafter.

It will be appreciated that, as a variant, it is possible to provide notch insulators between two consecutive teeth 14, in order to fit the coils 19, the teeth 14 then having a foot as can be seen in FIG. 8. It will be appreciated that the stator winding can be produced in a conventional manner by means of an undulated winding or as a loop. As a variant, the stator winding can use conductors in the form of bars, such as pins, as described in document EP 1 107 433.

As a variant, the teeth 14 of the body of the stator 11 can be added into the head 17, for example by means of dovetail fitting, in order to carry out the fitting of the coils 19 on the teeth 14 in advance. As a variant, the body of the stator can be segmented, as described for example in document US 2010/023 77 26.

The body of the rotor 5 is fitted on a support hub 48 described hereinafter. The inner periphery 60 (FIGS. 6 and 7) of the body of the rotor 5 is fitted on the outer periphery of the hub 48. This fitting can be carried out by forcing on. As a variant, it can be carried out by sintering. As a variant the outer periphery of the hub is knurled, and the set of plates of the rotor is forced onto the knurling of the hub 48. This hub 48 can be made of steel. In all cases the body of the rotor is integral axially and in rotation with the hub 48.

The stator 11 of the machine surrounds the rotor 5 with the presence of an air gap between the inner periphery of the stator 11 and the outer periphery of the rotor 5.

According to one characteristic, the assembly 1 comprises a hybrid module 2 comprising the release device 3, the electrical machine 4 and the torsion damper 8. This module 2 can be manipulated and is secured on the housing of the thermal engine 52. It can be transportable, and comprises for this purpose means for retention of the release device 3. These means can consist of a retention ring 37 described hereinafter. As can be seen for example in FIG. 1, this module 2 comprises a support 10 which covers the friction clutch 9 and part of the double damping flywheel 7.

The support 10 can be made of metal. It can be made of mouldable material and is for example an aluminium or an aluminium-based alloy. It is preferably made of non-magnetic material. This support 10 has in the aforementioned manner an inner flange 27 which forms a separation wall between the rotor 5 and the clutch 9, as can be seen in FIG. 1. This flange 27 is thus offset axially relative to the front support surface 10.

The outer periphery of the body of the stator 11 in the form of a set of plates is fitted clamped in the support 10, and in this embodiment has an inner periphery with a cylindrical form in order to co-operate with the outer periphery of the body of the stator 11. The body of the stator 11 can be fitted in the support 10 by sintering.

According to one embodiment, the front end of the intermediate shaft 6 is fitted in the crankshaft of the thermal engine 53, in a known manner, via a control bearing which is fitted in a cavity in the crankshaft.

According to an advantageous embodiment, the intermediate shaft 6 extends overhanging the front of the module 2, which simplifies the fitting of the hybrid module 2 of the assembly 1 on the thermal engine equipped with the double damping flywheel and the clutch 9.

According to one embodiment, the support 10 of the hybrid module 2 comprises first securing means 13 which are configured to be secured on the housing of the gearbox 53, and second securing means which are configured to be secured on the housing of the thermal engine 52. As illustrated in FIGS. 13 and 14, the first 13 and second 16 securing means can consist of perforated projecting outer rims. As a variant, the first 13 and/or second 16 securing means can consist of holes which are provided in a base of the support 10. This variant is illustrated in FIG. 12, according to which the securing means 13 consist of holes which are provided in a base of the support 10. These holes in the base or the outer rim permit passage of securing units such as rivets.

The support bears on its interior between the first and second securing means the stator 11 of the electrical machine. For this purpose, the head of the stator 11 is for example secured by sintering in the interior of the support 10.

According to one embodiment, the stator comprises an interconnector 22 which is represented in particular in FIGS. 1 to 3, with connection terminals U, V, W represented in FIG. 4 for the interconnection with a power connector. The support 10 can comprise a passage 23 which is illustrated in FIGS. 13 and 14. This passage allows connection terminals to extend from the exterior of the support 10.

According to one embodiment, the support 10 has a cooling circuit 55 in order to cool the stator. For this purpose, an annular form 55, which is produced by moulding in sand, and is illustrated in cross-section in FIGS. 1 to 3 and 10, is provided on the entire periphery of the support, around the stator 11. This annular form, which is associated with input orifices 24 and 25 represented in FIGS. 13 and 14, forms a cooling circuit which for example permits circulation of a cooling fluid.

Figure 5:
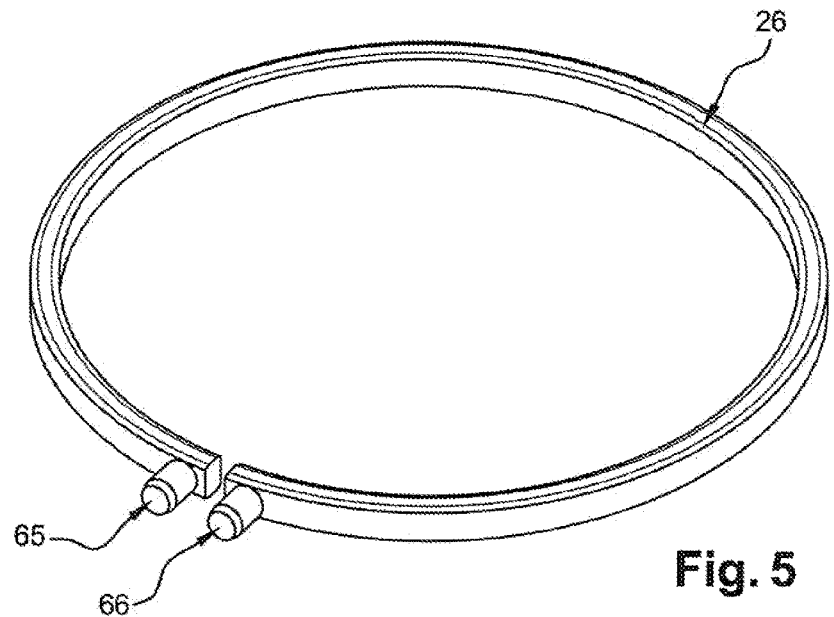
FIG. 5 is a view in perspective showing an embodiment of the cooling channel of the stator of the electrical machine in the form of a tube.

As a variant, this cooling circuit can be obtained by over-moulding the support on a tube 26 which is illustrated in FIG. 5. This tube 26 comprises an opening 65 and a closure 66. This tube 26 permits circulation for example of a cooling fluid.

Advantageously, the two securing means 13 and 16 are present on both sides of the support 10, which has a certain length between the gearbox 53 and the housing of the engine 52. This therefore prevents routing of the cooling circuit between the different securing holes, as described in FIGS. 13 and 14 of patent application PCT/FR99/01863.

According to one embodiment, the support 10 comprises an inner flange 27 which is illustrated in FIGS. 1 to 3 and 10.

This inner flange permits separation between the electrical machine 4 and the friction clutch 9. Thus, the inner flange 27 makes it possible to prevent dust from the clutch, which can disrupt the functioning of the electrical machine, from entering into the electrical machine 4.

This inner flange has at its inner end a sleeve 28 with an axial form which penetrates in the interior of the rotor 5, as illustrated in FIGS. 1, 3 and 10. The intermediate shaft 6 passes through this sleeve 28. The sleeve 28 has two portions 285 and 286 illustrated in particular in FIGS. 1 to 3, which do not have the same diameter. The portion 286, which extends further into the interior of the rotor 5, has a diameter smaller than that of the portion 285. Thus, it is possible to fit a ball bearing 30 between the second portion 286 and the intermediate shaft 6. The two portions 285 and 286 extend axially on both sides of a base 29 of the sleeve. This base is perforated, such that the shaft 6 can pass through it.

According to one characteristic, the concentric release device 3 of the friction clutch 9, through which the shaft 6 passes, is fitted partly in the interior of the first portion 285 of the sleeve 28. This device 3 is radially compact.

In the aforementioned manner, the release device 3 in FIGS. 1 to 3 is a hydraulically controlled stop 35 which is supported on the base 29. This device comprises protective bellows.

Figure 16:
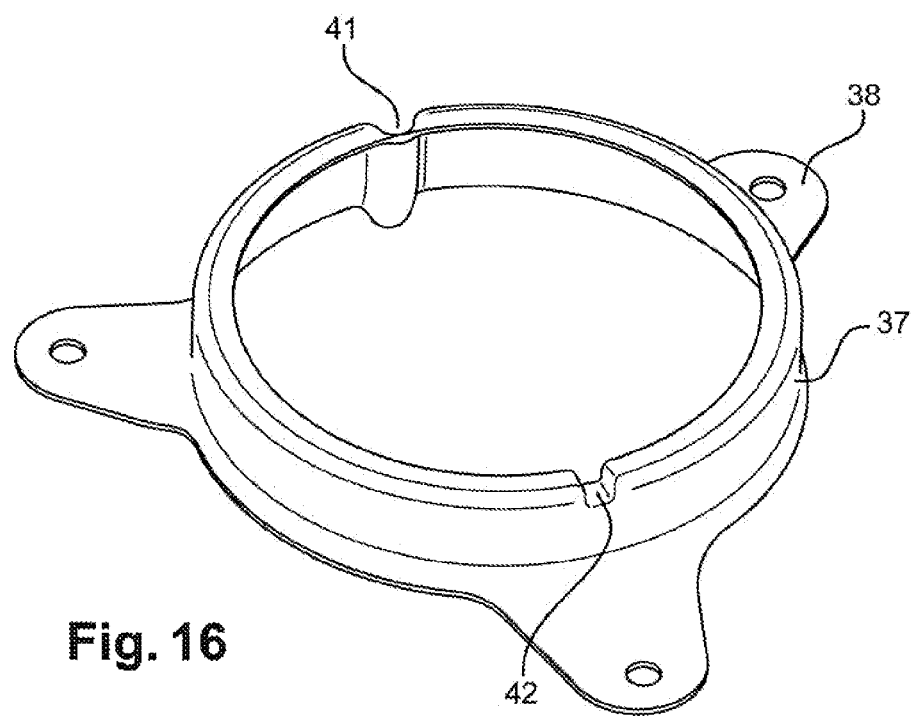
FIG. 16 is a view in perspective of the ring for retention of the hydraulically controlled release stop in FIG. 1.

A ring 37 (cf. FIGS. 1 to 3 and 16) for retention of the release device 3 is provided, which penetrates in the sleeve 28, and is provided with at least one lug 38 for securing on the flange 27. As can be seen in FIG. 16, this ring comprises three lugs 38 for its securing on the globally transverse inner end of the flange 27, integrally with the support 10. In this case, this flange 27 is moulded integrally with the support 10.

In the aforementioned manner, the release device 3 has a body 40 (cf. FIGS. 1 to 3). The end of the ring 37 which penetrates in the sleeve 28 has a collar 39 for support on the body of the release device 3. In this case, this ring 37 is made of stamped plate.

The collar for support of the ring 37 is advantageously inclined axially, and thus exerts preloading on the body 40 of the release device 35.

According to one embodiment, the retention ring 37 comprises a cut-out or an appendix 42 for co-operation respectively with an appendix or a cut-out which belongs to the body 40 of the release device 3, for blockage in rotation of the said body 40.

The retention ring 37 (cf. FIGS. 1 to 3 and 16) can have a passage 41 for a supply tube 45 of the hydraulically controlled stop 21. The tube can be guided by the flange 27. For this purpose, this flange 27 of the support 10 comprises a hollow for retention of the said supply tube 45.

According to one embodiment, the hybrid module 2 comprises a hub 48 for support of the rotor (cf. FIGS. 1 to 3) which is secured on the rear end of the intermediate shaft 6, on the torsion damper 8. Advantageously, the hub 48 for support of the rotor 5 has a reduced thickness at the front. Thus, the penetration with radial play of the sleeve 28 in the interior of the hub 48 is possible. For its securing, the hub can comprise an inner rim 49 with globally transverse orientation. Thus, securing the inner rim 49 on the rear end of the intermediate shaft 6 secures the hub 48. For its securing on the inner rim 49 and on the hub 48, the intermediate shaft 6 has at its rear end a centring support surface 50 and an axial stop 51 for the inner rim 49. This support surface 50 and this stop 51 permit positioning of the inner rim 49 and thus of the rotor 5. The axial stop 51 and the inner rim 49 are perforated for the passage of the unit, for example rivets, for securing of the inner rim 49 on the intermediate shaft 6.

The torsion damper 8 which can be seen in FIGS. 1 to 3, 10, 12 and 13, comprises at the front a first guiding washer 83 which can be seen in FIGS. 1 to 3 and 10, and at the rear it comprises a second guiding washer 82 which can be seen in FIGS. 1 to 3 and 10. The torsion damper also comprises an output hub 84 which is integral in rotation with the input unit 54 of the gearbox 53 (cf. FIGS. 2, 3 and 10). The output hub 84 is connected to a hub flange 81 with a globally radial direction 84. The two washers 83 and 82 are disposed on both sides of the hub flange 81. In addition, the first guiding washer 83 is integral in rotation with the shaft 6 by means of securing of the inner periphery of the said first guiding washer on the inner rim 49 of the hub 48 of the rotor 5.

According to one embodiment, the inner periphery of the first guiding washer 83 is offset axially forwards in order to create axial play between the first guiding washer 83 and the rear end of the rotor 5.

In addition, the aforementioned securing units which pass through the axial stop 51 and the inner rim 49, and are perforated for securing of the inner rim 49, also pass through the first guiding washer 83. Thus, they permit securing of the first guiding washer and of the hub 48 of the rotor 5 on the axial stop 51 of the intermediate shaft 6.

The first guiding washer 83 can comprise clefts 86 which can be seen in FIGS. 1 to 3. These clefts permit fitting of resilient units 87 such as helical springs which act circumferentially between the hub flange 81 and the first and second guiding washers respectively 82 and 83.

According to one embodiment represented in FIG. 1, the first guiding washer 83 has on its outer perimeter a curved rim facing towards the rotor 5 such as to create a deflector 85 in order to prevent penetration of particles derived in particular from the damper 8 into the electrical machine 4. For example, as illustrated in FIG. 1, the deflector 85 is positioned in the interior of the interconnector 22.

According to a second embodiment represented in FIGS. 2, 3, 10 and 11, the first washer 83 is not curved, but the hybrid module 2 additionally comprises first and second guiding washers for the damper 8, and an anti-dust flange 63 which can be seen in FIGS. 2, 3, 10 and 11. The flange 63 makes it possible to prevent penetration of particles derived in particular from the damper 8 into the electrical machine 4. The flange 63 is derived from an extension at the rear of the hub 48 of the rotor 5. It is integral in rotation with the first 83 and/or the second guiding washer 82.

According to a characteristic of this second embodiment, the inner periphery 631 of the flange 63 is offset axially rearwards relative to the inner rim 49.

According to another characteristic of this second embodiment, the outer periphery 632 of the flange 63 is offset axially rearwards relative to the inner periphery of the flange 63. According to another characteristic, the outer periphery of the flange 63 has an end 633 which is inclined in the direction opposite the rotor 5 (cf. FIGS. 2, 3, 10 and 11).

According to a characteristic of this second embodiment, the inclined end 633 is positioned in the interior of the interconnector 22 as can be seen in FIGS. 2, 3 and 10.

According to another characteristic of this second embodiment, in the case when the first guiding washer 83 comprises clefts 86 for fitting of resilient units 87, such as helical springs, the flange 63 is formed between its inner 631 and outer 632 peripheries, in order to follow the profile of the clefts 86.

In addition, as illustrated in FIG. 3, the support 10 can bear a magnetic stopper 59 at the rear of the interconnector 22, in order to receive the metal particles derived from the torsion damper 8.

As is apparent from the evidence of the description and the drawings, firstly the double damping flywheel 7 and the clutch 9 are secured on the crankshaft of the engine 52, then the hybrid module 2 is secured on the engine housing, and finally the housing of the gearbox 53 is secured on the hybrid module.

The body 40 of the release device 3 can be made of mouldable material. It can be made of aluminium, or as a variant of plastic material, advantageously reinforced by fibres.

The magnetic stopper 59 has a magnetic part on its inner end opposite the outer periphery of the damper 8. It has a part 57 with a head for example with six facets in order to be screwed into the metal support 10, between the interconnector 22 and the rear end of the support 10. FIG. 3 schematises the path 67 followed by the metal particles which are derived from the damper 8 and attracted by the metal parts 57 of the magnetic stopper.

The anti-dust flange 63 has an inner periphery 631 for connection to the hub 48, which periphery is offset axially rearwards relative to the inner rim 49 and the rear surface of the rotor 5, in order to prevent magnetic leakages. This flange 63 also has openings in its outer periphery 632 for the passage of rivets for assembly of the flange with the outer periphery of the metal guiding washers 82, 83, and thus with the damper 8. Similarly, in FIG. 2, the first guiding washer 83 has on its inner periphery openings for its assembly by means of screws with the inner periphery of the rim 49 of the hub of the metal rotor and the axial stop 51 of the intermediate shaft 6, and for this purpose it has openings corresponding to those of the stop 51. This stop has an annular form, and can consist of a collar with a small diameter. The centring support surface 50 of the shaft 6 is in close contact with the inner periphery of the rim 49 of the hub, in order to provide an air gap between the rotor 5 and the stator 11. The same applies in FIGS. 2 and 3. In these figures, the rim 49 has openings opposite openings present in the stop, for assembly of the rim on the stop 51, for example by means of rivets. In all cases the damper 8 is captive, since it is secured on the hub 48 of the rotor 5 at the rear of the shaft 6, the front end of which passes through the concentric release device 3, in order to be engaged with the hub of the clutch 9, for example by means of a connection with ribbing. The ring 37 makes the device 3 captive before assembly of the hybrid module 2 on the housing of the thermal engine of the vehicle.

In general it is possible to use screws, rivets or bolts or the like in order to secure the flange 63 on the washers 82, 83, and to secure the rim 49 and/or the inner periphery of the washer 83 on the stop 51.

The offsetting rearwards of the metal flange 63 (FIGS. 2 and 3) and of the inner periphery of the metal guiding washer 83 relative to the rear end of the rotor, makes it possible to reduce the magnetic leakages.

As can be seen in FIGS. 1 to 3, the flange 27 has axial offsetting towards the front at its outer periphery, for accommodation of the coils of the stator 11.

Figure 17:
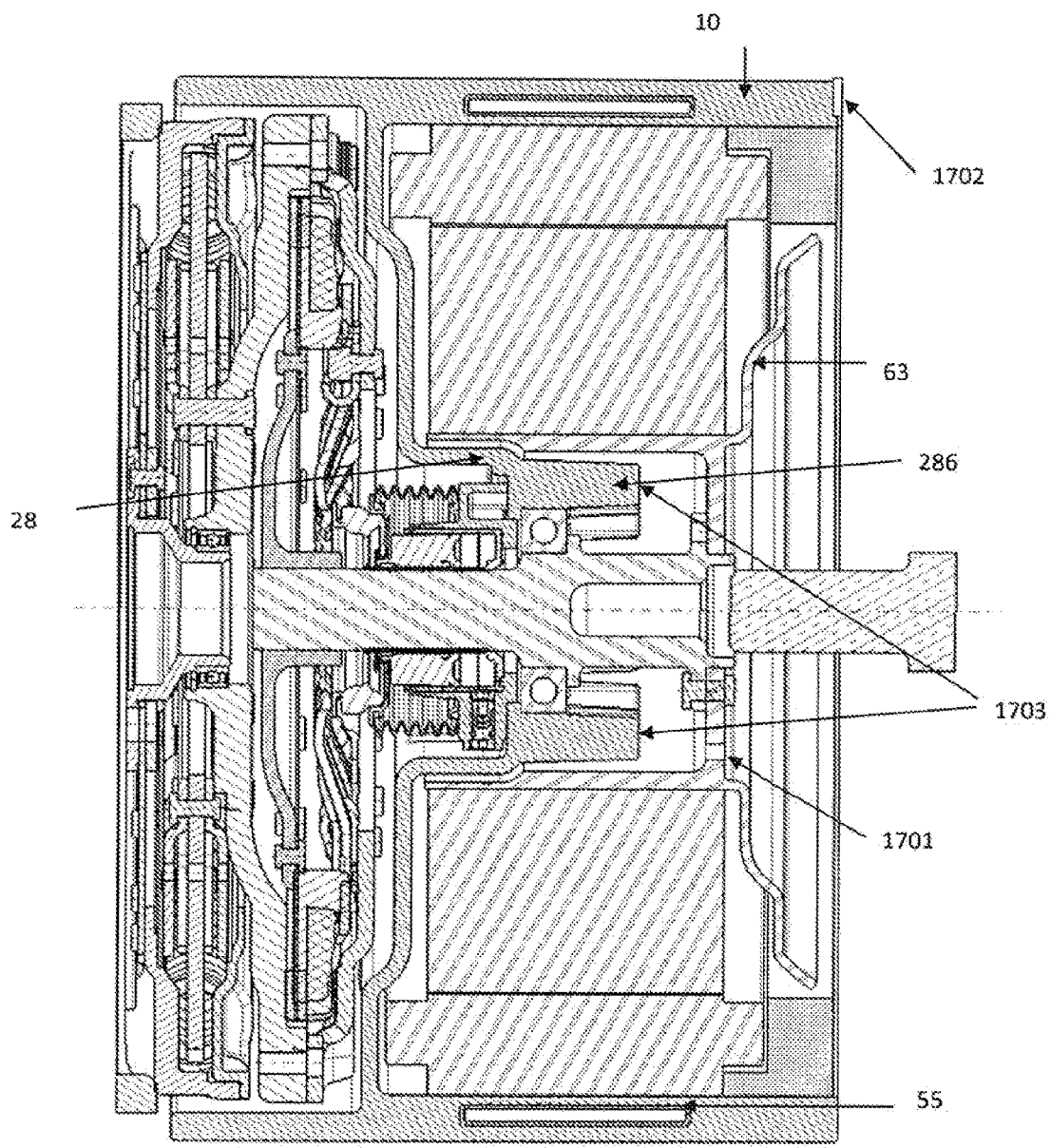
FIG. 17 is a partial view in axial cross-section showing the reversible rotary electrical machine according to another embodiment

As can be seen in FIG. 17, openings 1701 and 1702 can be provided respectively in the flange 63 and the support 10. These openings permit circulation of air in order to cool the machine. In addition, as illustrated in FIG. 17, it is possible to provide fins 1703 arranged in the portion 286 of the sleeve 28, in order to permit optimum cooling of the electrical machine, in addition to the cooling circuit 55.

The invention claimed is:

1. Transmission assembly (1) for a motor vehicle with a gearbox (53) comprising a clutch (9), a clutch release device (3), a reversible rotary electrical machine (4) provided with a rotor (5) with a central opening, an intermediate shaft (6) between the clutch and the rotor (5) of the electrical machine (4), said intermediate shaft (6) bearing the release device (3) at the front, and penetrating in the central opening in the rotor (5), wherein it comprises a dry friction clutch (9) provided with a reaction plate, and in that it comprises, at the front, a double damping flywheel (7) which is configured to be secured on a crankshaft of a thermal engine (52) of the vehicle, and to form the reaction plate of the dry friction clutch (9), and at the rear, it comprises a torsion damper (8) which is configured to be connected in rotation to an input shaft (54) of the gearbox (53), and in that the rotor (5) of the electrical machine (4) is secured on the torsion damper (8).

2. Assembly according to claim 1, characterized in that it comprises a hybrid module (2) comprising the release device (3), the electrical machine (4) and the torsion damper (8).

3. Assembly according to claim 2, characterized in that the intermediate shaft (6) extends overhanging at the front of the module (2).

4. Assembly according to claim 2, characterized in that the hybrid module (2) comprises a support (10) comprising first securing means (13) to be secured on a housing of the gearbox (53), and second securing means (16) to be secured on a housing of the thermal engine (52), and in that, in its interior between the first and second securing means (13, 16), the support (10) bears a stator (11) of the electrical machine (5).

5. Assembly according to claim 4, characterized in that the support (10) comprises an inner separation flange (27) between the electrical machine (4) and the friction clutch (9), and in that the flange (27) has at its inner end an axial sleeve (28) which penetrates in the interior of the rotor (5) of the electrical machine (4) and through which the intermediate shaft (6) passes.

6. Assembly according to claim 5, characterized in that the sleeve (28) has a base (29) which is perforated centrally for the passage of the shaft (6).

7. Assembly according to claim 6, characterized in that the release device (3) is controlled hydraulically, and comprises a body (40) supported on the base (29) and a stop (35) for action on the friction clutch (9).

8. Assembly according to claim 4, characterized in that the support (10) bears a magnetic stopper (59) at the rear of an interconnector (22), in order to receive metal particles derived from the torsion damper.

9. Assembly according to claim 4, characterized in that an annular form is arranged in the support in order to form a hydraulic circuit (55).

10. Assembly according to claim 4, characterized in that an opening (1702) is arranged in the support (10) in order to permit the passage of the air.

11. Assembly according to claim 5, characterized in that it comprises a ring (37) for retention of the release device (3) which penetrates in the sleeve (28) and is provided with at least one lug (38) for securing on the flange (27).

12. Assembly according to claim 5, characterized in that fins (1703) are provided in a portion (286) of the sleeve (28).

13. Assembly according to claim 1, characterized in that it comprises a rotor support hub (48) which is secured at the rear end of the intermediate shaft (6) on the torsion damper (8).

14. Assembly according to claim 13, characterized in that the rotor support hub (48) comprises an inner rim (49) with globally transverse orientation for its securing on the rear end of the intermediate shaft (6).

15. Assembly according to claim 13, characterized in that the intermediate shaft (6) has at its rear end a centring support surface (50) for the inner rim of the hub and an axial stop (51) for the inner rim (49).

16. Assembly according to claim 15, characterized in that the axial stop (51) and the inner rim (49) are perforated for the passage of units for securing of the inner rim (49) on the intermediate shaft (6).

17. Assembly according to claim 13, characterized in that the torsion damper (8) comprises at the front a first guiding washer (83) and at the rear a second guiding washer (82) which are integral with one another, in that the first and second guiding washers (82, 83) are disposed on both sides of a hub flange (81) which is configured to be connected to an output hub (84) integral in rotation with the input shaft (54) of the gearbox (53), and in that the first guiding washer (83) is secured at its inner periphery on the inner rim (49) of the rotor (5) hub (48).

18. Assembly according to claim 13, characterized in that the rotor (5) hub (48) is prolonged at the rear by a flange (63).

19. Assembly according to claim 18, characterized in that an opening (1701) is arranged in the flange (63) in order to permit the passage of the air.

20. Assembly according to claim 1, characterized in that the double damping flywheel (7) comprises primary and secondary engine flywheel units which are substantially coaxial, mobile in rotation relative to one another, and coupled by means of first and second damping means which are arranged in series by means of a connection flange.

* * * * *